Dec. 30, 1958   F. M. STANBRO   2,866,655
SEALS FOR ROTATING SHAFTS
Filed April 26, 1956
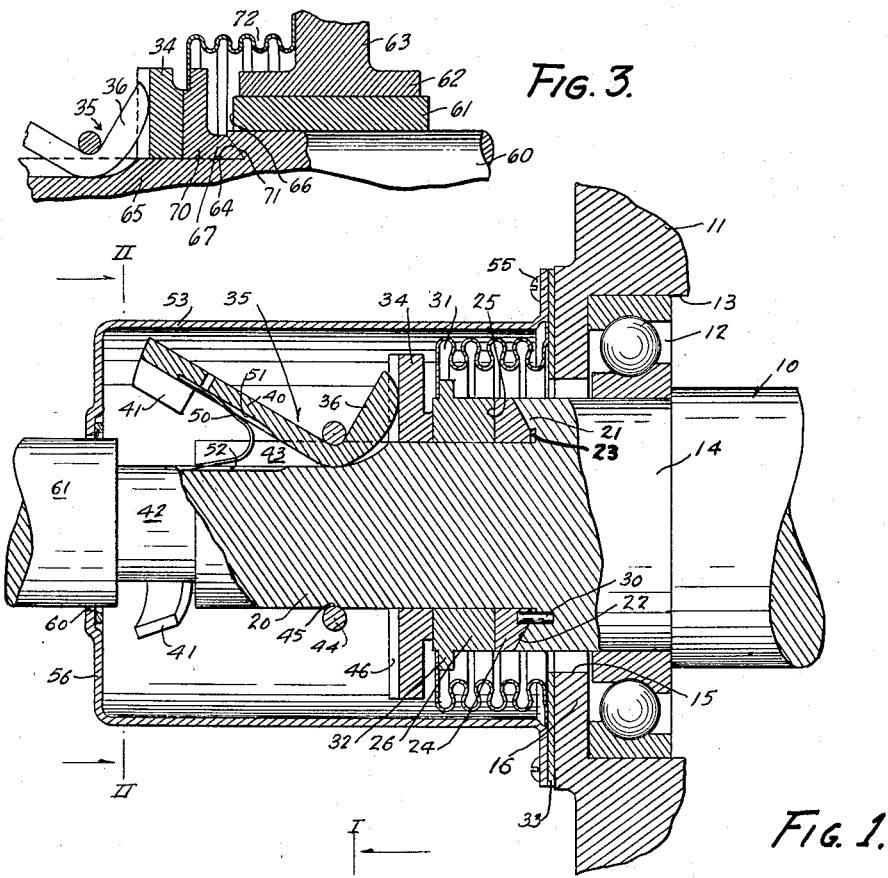
INVENTOR.
FOREST M. STANBRO
BY
Bean, Brooks, Buckley & Bean
ATTORNEYS

United States Patent Office

2,866,655
Patented Dec. 30, 1958

2,866,655

SEALS FOR ROTATING SHAFTS

Forest M. Stanbro, Salamanca, N. Y.

Application April 26, 1956, Serial No. 580,903

10 Claims. (Cl. 286—11)

My invention relates in general to shaft seals and in particular to a packing device for sealing high speed shafts.

It is well known to those skilled in the art that attempts have heretofore been made to seal shaft bearings against leakage by means of packing rings pressed together by means of springs. However, at high speeds and under increased pressure conditions, such spring means fail to produce sufficient pressure to maintain the seal, and some means must be provided to supplement the spring means if the seal is to be effective at elevated speeds.

The principal object of my invention is to provide a shaft seal having spring means for maintaining the bearing surfaces in normal contact, but which has additional centrifugal means for increasing the pressure between the seal surfaces when the shaft is rotated.

Another object is to provide means governed by the speed of rotation of the shaft for varying the pressure between the seal surfaces, which will effectively seal a shaft against leakage of gases or liquids at substantially any working pressure.

A further object is to provide a seal having a replaceable packing ring.

Moreover, my seal is of such a nature that it may be effectively used on shafts having a limited amount of thrust or end play.

Furthermore, my device is so designed that it may be easily disassembled for replacement of parts, and is of such construction that it will function for long periods of time without attention.

The above objects and advantages have been accomplished by the device shown in the accompanying drawings, of which:

Fig. 1 is a sectional elevation of my device taken on line I—I of Fig. 2;

Fig. 2 is a sectional view taken on line II—II of Fig. 1;

Fig. 3 is a modified form of the invention; and

Fig. 4 is another modification thereof.

Referring to the form of invention shown in Figs. 1 and 2, the shaft to be sealed by my device is indicated at 10, and 11 represents the housing of the pump or other machine element through which the shaft is projected.

As shown in Fig. 1, the shaft 10 is mounted upon a ball bearing 12 disposed within a recess 13 formed in the housing. The inner race of the ball bearing is preferably fitted over a reduced portion 14 of the shaft. The reduced portion of the shaft extends outwardly through an opening 15 formed in the end flange 16 of the housing 11. Extending forwardly from the reduced portion 14 of the shaft is a drive portion 20. The drive portion is of considerably less diameter than the reduced portion 14 whereby a shoulder 21 is formed between these two shaft portions. The shoulder is formed with an inwardly projecting cone-frustum shaped surface 22 which is formed at the point of juncture of the shoulder and said drive portion with a clearance groove 23. The drive portion of the shaft extends outwardly and is provided with a suitable coupling (not shown) whereby it may be driven by any suitable source of power.

Mounted upon the drive portion 20 of the shaft is the packing ring 24 of my device which is formed at the side adjacent the shoulder 21 with a surface of cone-frustum shape which corresponds to the shape of the surface 22 and which is in intimate sealing contact therewith. The packing ring is preferably of hardened steel, and the cone-frustum surfaces of this ring and the shoulder are preferably ground so that when pressed together, they will effectively seal the joint therebetween. Mounted upon the drive portion of the shaft and disposed adjacent the surface 25 of the ring 24 is a bearing ring 26. This bearing ring which is preferably of bronze has its inner surface in bearing contact with the surface 25 of the packing ring whereby to provide an effective seal therebetween. The packing ring 24 is preferably prevented from relative rotation with the shaft, and a detent pin 30 is carried by the shoulder 21 thereof and engages the packing ring whereby the ring will be anchored to said shaft and will be caused to rotate therewith.

In order to compensate for end play in the shaft, I provide a metallic bellows 31 which encloses the several sealing surfaces. This bellows is hermetically sealed at one end by being secured to a flange 32 formed on the bearing ring 26, and the other end of the bellows is hermetically sealed by being secured to a bellows washer 33 which is secured to the outside face of the flange 16 of the housing. Obviously, the bellows may be secured to the several parts by any suitable means, such as soldering or brazing.

Mounted upon the drive portion 20 of the shaft is a thrust ring 34 which is disposed adjacent the bearing ring 26 and which is movable axially upon the shaft. Carried by the outwardly extending end of the drive portion 20 of the shaft and adjacent the thrust ring 34 is a series of centrifugal cams 35, each having a cam arm 36 and a weight arm 40. A suitable weight 41 is carried by each of the arms 40 and each is preferably concave in form as shown in Fig. 2 so that when being assembled, the weights will occupy a groove 42 formed in the outer end of the shaft, which also provides for ready disassembling of the parts of the device. Each of the centrifugal cams 35 is mounted in a longitudinal cam groove 43 formed in the drive portion 20 of the shaft, and they are held in pivotal relation with the grooves by means of a retaining ring 44, which engages the cams at the points of juncture of the cam arms and weight arms. This ring is preferably resilient and engages a ring groove 45 formed in the portion 20 of the shaft, whereby, when so engaged, it will be prevented from axial movement with relation to the shaft and will retain said cams in their pivotal positions in the groove. Each of the cam arms 36 is disposed in a radial groove 46 formed in the outer face of the thrust ring 34. A flat spring 50 is provided for each cam and has one end thereof mounted in a spring groove 51 formed in the weight arm 40 of each of the cams. The other end of each spring is mounted in a spring groove 52 formed in the drive portion 20 of the shaft at the bottom of the groove 43. These springs normally maintain the centrifugal cams in the position shown in the drawings.

A shield 53 encloses the working parts of my device, and it is formed at its inner end with a flange 54 which is bolted to the flange 16 of the housing by means of screws 55 which serve to not only maintain the shield in position, but also serve to secure the bellows washer 33 in sealing contact with the flange 16. The shield is formed with an end wall 56 which is provided with an opening 60 through which the end 61 of the shaft projects. A dust gasket 62 is preferably provided in the wall 56 for sealing the opening between the shaft and the shield.

From the foregoing, it will be obvious that when the shaft is stationary, the springs 50 will serve to hold the various packing joints in sealing contact. When, however, the shaft is rotated, the arms of the centrifugal cams will be thrown outwardly by centrifugal force and the joint between the surface 25 of the packing ring and the coacting surface of the bearing ring 26 will be firmly pressed together in sealing relation by centrifugal action and thereby prevent leakage of gases or liquids around the shaft. Obviously, the pressure exerted against the coacting sealing surfaces will be increased with an increase of speed of rotation of said shaft.

While I have shown in the drawings a shoulder formed between the reduced shaft portion 14 and the shaft 10, it is obvious that the invention is applicable to shafts having a sleeve bearing in which there is some end play, as shown in Fig. 3. In this form of the invention, 60 represents the shaft which is mounted within a sleeve bearing 61 carried by the flange 62 of the housing 63. The shaft is formed with a reduced diametrical portion 65 thus forming a shoulder 64 preferably of cone-frustum shape which normally extends beyond the front face 66 of the sleeve. The packing ring 70 in this form of invention is rotatably mounted upon the reduced portion 65 of the shaft and has a polished surface 71 of cone-frustum shape for sealing contact with the shoulder 64. The diameter of the hub portion 67 of the packing ring is preferably slightly less than the bore of the sleeve, thereby when axial movement of the shaft occurs the portion 67 may move inwardly within the sleeve. As in the other form of the invention, a metallic bellows 72 is used to seal the joint between the body and the packing ring and it is suitably attached to the body and to the ring. In this form of invention a thrust washer 34 is employed and centrifugally-actuated thrust members 35 are carried by the reduced portion 65 of the shaft. Furthermore, while I have shown a separate renewable packing ring, this element may be omitted and the bearing ring brought into bearing contact with the shoulder of the shaft. Moreover, the thrust ring 34 may be replaced by an anti-friction thrust bearing mounted between the bearing ring 26 and the cam arms 36. These last two mentioned modifications are shown in Fig. 4 where a packing ring 73 having a cone-frustum shaped surface is pressed against a shoulder 74 of cone-frustum shape formed on the shaft 10. The shaft, as in the form of invention shown in Fig. 1, is carried by an anti-friction bearing 12 which is supported by the housing 11. Connecting the packing ring with the housing 11 is a bellows 31. A thrust ring 75 is mounted upon the shaft and carries one element 76 of a thrust bearing 81, the other element thereof being rotatably mounted upon the drive portion 20 of the shaft and bearing against the packing ring 73 in nonrotatable manner.

These and other modifications of the details herein shown and described may be made without departing from the spirit of my invention or the scope of the appended claims.

What is claimed is:

1. The combination with a housing having a shaft extending through one wall thereof, of shaft sealing means comprising an outwardly facing shoulder formed on said shaft, a bearing ring slidably mounted upon the drive portion of said shaft and having its inner face in bearing relation with the face of said shoulder, an expansible diaphragm connecting said bearing ring with said housing in hermetically sealed manner, and centrifugally actuated lever means for urging said bearing ring toward said shoulder.

2. The combination with a housing having a shaft extending through one wall thereof, of shaft sealing means comprising an outwardly facing shoulder formed on said shaft, said shoulder having an inwardly flaring cone-frustum shape, a separate packing ring mounted upon said shaft and bearing against said shoulder, said packing ring having a surface of cone-frustum shape for coaction with the cone-frustum shaped shoulder of said shaft, means for fixing said packing ring onto said shaft, a bearing ring slidably mounted upon the drive portion of said shaft and having its inner face in bearing relation with the face of said packing ring, a bellows having one end hermetically attached to said bearing ring, the other end of said bellows being hermetically attached to said housing, and centrifugally actuated lever means for urging said bearing ring toward said packing ring.

3. The combination with a housing having a shaft extending through one wall thereof, said shaft having a drive portion of reduced diameter, of shaft sealing means comprising an outwardly facing shoulder formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, and centrifugally actuated lever means carried by said drive portion for pressing said thrust ring against said bearing ring upon rotation of said shaft.

4. The combination with a housing having a shaft extending through one wall thereof, said shaft having a drive portion of reduced diameter, of shaft sealing means comprising an outwardly facing shoulder formed on said shaft, said shoulder having an inwardly flaring cone-frustum shape, a separate packing ring mounted upon said shaft and bearing against said shoulder, said packing ring having a surface of cone-frustum shape for coaction with the cone-frustum shaped shoulder of said shaft, a bearing ring slidably mounted upon the drive portion of said shaft and having its inner face in bearing relation with the face of said packing ring, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, and centrifugally actuated lever means carried by said drive portion for pressing said thrust ring against said bearing ring upon rotation of said shaft.

5. The combination with a housing having a shaft extending through one wall thereof, said shaft having a drive portion of reduced diameter, of shaft sealing means comprising an outwardly facing shoulder formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, and centrifugal means carried by said drive portion for pressing said thrust ring against said bearing ring upon rotation of said shaft to seal the latter, said centrifugally actuated lever means comprising a plurality of cams pivotally carried by said drive portion, each cam having a weight portion and a cam portion for bearing contact with said bearing ring.

6. The combination with a housing having a shaft extending through one wall thereof, said shaft having a drive portion of reduced diameter, of shaft sealing means comprising an outwardly facing collar formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, said drive portion being formed with a plurality of longitudinal grooves, a centrifugal cam disposed in each groove and having a cam portion engageable with said thrust ring, means for pivotally holding said cams in said grooves, and spring means disposed between said cams and said shaft for maintaining normal pressure upon said sealing means.

7. The combination with a housing having a shaft extending through one wall thereof, said shaft having a drive portion of reduced diameter, of shaft sealing means comprising an outwardly facing shoulder formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, said drive portion being formed with a plurality of longitudinal grooves, a centrifugal cam disposed in each groove and having a cam portion engageable with said thrust ring, a retaining ring for pivotally holding said cams in said grooves, said ring being in resilient engagement with a groove formed in said driving portion, and spring means disposed between said cams and said shaft for maintaining normal pressure upon said sealing means.

8. The combination with a housing having a shaft extending through one wall thereof, said shaft having a drive portion of reduced diameter, of shaft sealing means comprising an outwardly facing shoulder formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, centrifugally actuated lever means carried by said drive portion for pressing said thrust ring against said bearing ring upon rotation of said shaft to seal the latter, said centrifugally actuated lever means comprising a plurality of centrifugally-actuated thrust members pivotally carried by said drive portion, each member having a weight portion and a cam portion for bearing contact with said bearing ring, and a spring carried by said drive portion for each cam and engageable with the weight portions thereof.

9. The combination with a housing having a shaft extending through one wall thereof, said shaft having a drive portion of reduced diameter, of shaft sealing means comprising an outwardly facing shoulder formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, centrifugally actuated lever means carried by said drive portion for pressing said thrust ring against said bearing ring upon rotation of said shaft to seal the latter, said centrifugally actuated lever means comprising a plurality of centrifugally-actuated thrust members pivotally carried by said drive portion, each member having a weight portion and a cam portion for bearing contact with said bearing ring, and said thrust ring being provided with radial grooves for the reception of the cam portion of said cams.

10. The combination with a housing having a shaft extending through one wall thereof, said shaft having a drive portion of reduced diameter, of shaft sealing means comprising an outwardly facing shoulder formed on said shaft, a bearing ring slidably mounted upon the drive portion of said shaft and having its inner face in bearing relation with the face of said shoulder, a bellows having one end hermetically attached to said bearing ring, the other end of said bellows being hermetically attached to said housing, a thrust ring slidably mounted upon the drive portion of said shaft and having the inner surface thereof in bearing contact with said bearing ring, centrifugally actuated lever means carried by said drive portion for pressing said thrust ring against said bearing ring upon rotation of said shaft to seal the latter, said centrifugally actuated lever means comprising a plurality of thrust members pivotally carried by said drive portion, each member having a weight portion and a cam portion for bearing contact with said bearing ring, a spring carried by said drive portion for each cam and engageable with the weight portions thereof, and said thrust ring being provided with radial grooves for the reception of the cam portion of said cams.

References Cited in the file of this patent

UNITED STATES PATENTS

| | | |
|---|---|---|
| 978,310 | Kruger | Dec. 13, 1910 |
| 1,383,028 | Roloff | June 28, 1921 |
| 1,539,941 | Gentry | June 2, 1925 |
| 1,840,127 | Penney | Jan. 5, 1932 |
| 1,861,275 | Hopkins | May 31, 1932 |
| 2,133,879 | Thearle | Oct. 18, 1938 |